Patented Nov. 20, 1945

2,389,325

UNITED STATES PATENT OFFICE 2,389,325

PROCESS FOR THE MANUFACTURE OF α-HYDROXYCARBONYL COMPOUNDS

Tadeus Reichstein, Basel, Switzerland

No Drawing. Application January 21, 1942, Serial No. 427,669. In Switzerland February 14, 1941

6 Claims. (Cl. 260—397.4)

It is known that carbonyl compounds, viz. aldehydes or ketones, can be obtained by the action of periodic acid, lead tetraacylates or the like on glycols, while splitting up the carbon-carbon bond. This reaction has repeatedly been used in the steroid series for the partial or complete degradation of side chains. If at least three vicinal carbon atoms of a compound carry one hydroxyl group each, of which at least one is of primary nature, and if only the primary carbinol group is to be split off with formation of an α-hydroxy-carbonyl compound, one has up to now proceeded, for example in the steroid series, in such a manner that remaining hydroxyl groups have been intermediarily protected from the oxidative influence by esterification or etherification, while leaving a final glycol grouping unoccupied. The manufacture of such polyoxy compounds which are only partially esterified or etherified however, is circumstantial and moreover, if it is desired to obtain free α-hydroxy carbonyl compounds, the ester- or ether groups must again be saponified after the oxidation which is difficult or altogether impossible especially with alkali-sensitive α-hydroxyaldehydes.

It has now been found that instead of over such intermediate stages one may obtain α-hydroxy-carbonyl compounds also directly and therefore in better yield, when splitting off the primary carbinol group in compounds containing at least three vicinal carbon atoms which are each substituted by a free hydroxyl group, at least one of them being a primary hydroxyl group, with the approximate equimolecular amount of an oxidizing agent of the type of periodic acid, lead tetraacylates and the like.

As parent materials for the new process there may be used for example polyalcohols such as glycerine, erythrites, pentites, hexites, heptites such as for instance adonite, xylite, rhamnite, mannite, further for example pentoses, hexoses such as arabinose, glucose, fructose and especially also steriods, for instance of the following constitution

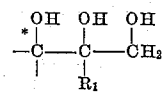

I

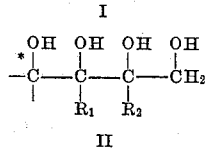

II

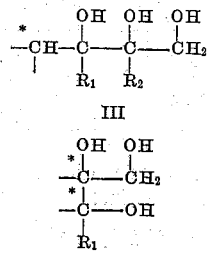

In these formulas $R_1$ and $R_2$ stand for hydrogen or hydrocarbon radicals, whereas the carbon atoms marked * belong to the steroid nucleus. Moreover the starting compounds can of course be saturated or unsaturated, be of any desired steric configuration and contain further substituents for example in 3, 6, 7, 11, 12, 16 and/or 17-position. In the case of steroids one starts particularly from compounds which contain one free hydroxyl group each in at least three vicinal carbon atoms of which at least one stands in a side chain, the final hydroxyl group being of primary nature (Formulas I-IV). Of the aliphatic compounds those are especially suitable as starting materials which contain only one primary carbinol group, or those which yield the same reaction product if one or the other of their two primary carbinol groups is split off. As starting materials there are especially named for instance 17:20:21-trioxy-pregnane; 17:20:21-trioxy-20-alkyl-pregnane; 17:20:21-trioxy-21-hydroxymethyl-pregnane; 20:21-dioxy-21-hydroxymethyl-pregnane; 20:21-dioxy-20-alkyl-21-hydroxymethyl-pregnane, and -allo-pregnane or corresponding 3-keto- or 3-hydroxy-compounds, respectively, which may also contain further substituents, as well as double bonds in 4:5- or 5:6-position. They are either known or may be prepared according to completely analogous reactions like the known compounds by using methods known in themselves.

The action of the oxidizing agents of the type of periodic acid, of lead tetraacylates and the like takes place in known manner, using the approximate equimolecular amount of an oxidizing agent necessary for splitting off a single carbinol group. It is especially necessary to observe the molecular quantity of the oxidizing agent more strictly if the products formed, for instance α:β-dioxyaldehydes, can be further decomposed by the oxidizing agent used.

In the new process the oxidizing agent surprisingly attacks practically only the final glycol groupings. The products of the present process, α-hydroxyaldehydes and α-hydroxyketones, obtainable from the parent compounds indicated by formulas, possess therefore the following formulas, for example

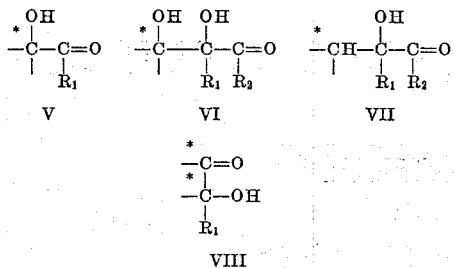

wherein $R_1$ and $R_2$ stand for hydrogen or hydrocarbon radicals, whereas the carbon atoms marked * belong to the steroid nucleus. They may be isolated according to known methods or used in crude state for further reactions.

The final products are intended for example for therapeutic use or they may serve as intermediate products for the manufacture of therapeutically active compounds.

The following examples illustrate the invention, the parts being by weight:

*Example 1*

5 parts of $\Delta^4$-21-hydroxymethyl-pregnene-3-one-17β-20:21-triol of the formula

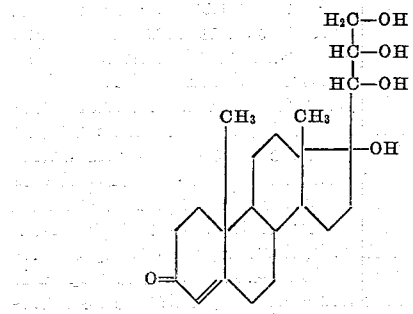

are dissolved in 600 parts of hot dioxane, the solution is cooled and mixed with a solution of 3 parts of periodic acid in 100 parts of water and 300 parts of dioxane. Crystals begin to separate from the clear solution after a short time and no more periodic acid can be detected after ½ hour in the spot test with manganese sulfate and phosphoric acid. 25 parts of a potassium bicarbonate solution of 5 per cent strength are added to the solution after altogether 50 minutes, the whole is strongly concentrated in a vacuum at 30° C., mixed with much water and shaken out with much ether. The ether solution is washed with water, dried with sodium sulfate and evaporated. 4.8 parts of crude $\Delta^4$-pregnene-3-one-17β:20-diol-21-al of the formula

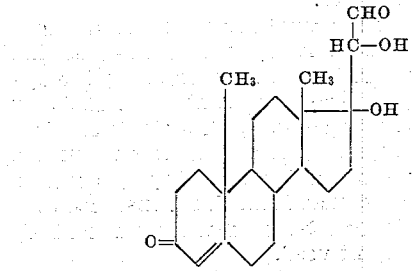

are thus obtained. This aldehyde may be obtained as a crystalline powder by precipitating a methanolic solution containing preferably some aqueous potassium bicarbonate solution by means of little water and then by concentrating in a vacuum. It represents fine grains melting at about 150° C., reduces alkaline silver diammine solution very considerably and yields a strong, green fluorescence with concentrated sulfuric acid. Its crystallized monoacetate melts at 206–208° C.

The $\Delta^5$-pregnene-3:17β:20-triol-21-al forming fine needles of decomposition point 235° C. is obtained from $\Delta^5$-21-hydroxymethylpregnene-3:17β:20:21-tetrol of melting point 247–252° C.; similarly the allo-pregnane-3:17β:20-triol-21-al, a fine powder melting at 190–202° C. with decomposition, may be obtained from the 21-hydroxymethyl-allo-pregnane-3:17β-20:21-tetrol of melting point 258–259° C. These two final products have the following formulas:

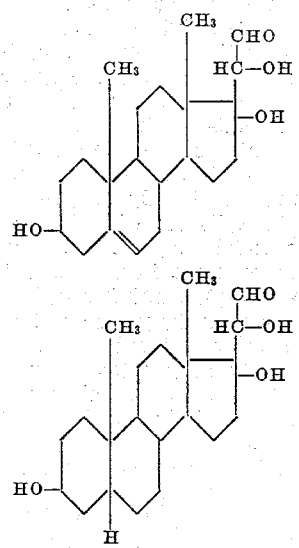

*Example 2*

3,5 parts of $\Delta^4$-pregnene-3-one-17β:20:21-triol of the formula

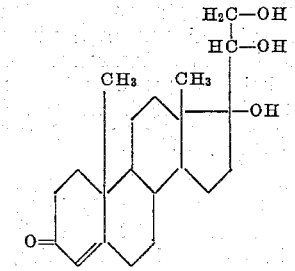

are dissolved in 350 parts of methanol and this solution is mixed with a solution of 1.9 parts of periodic acid in 100 parts of water. The mixture is allowed to stand at room temperature in an atmosphere of nitrogen until no more periodic acid can be detected, whereupon it is concentrated in a vacuum and the residue is extracted with ether. The ether solution is washed with dilute bicarbonate solution and water, dried and evaporated. On recrystallizing the residue from a mixture of acetone and ether there are obtained nice crystals of melting point 142–148° C. having a rotation of $[\alpha]_D = +49.4°$ in acetone.

They represent the aldehyde $\Delta^4$-17-formyl-androstene-3-one-17β-ol of the formula

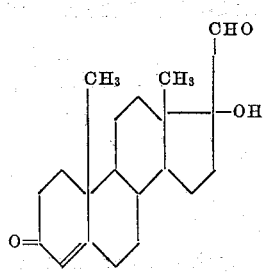

The same product is obtained for example also when working with an alkali salt of periodic acid with addition of sulfuric acid or by the action of about 1 mol of a lead tetraacylate, such as lead tetraacetate, lead tetrapropionate or lead benzoate, for example in a benzene solution.

When starting from the stereoisomeric $\Delta^4$-pregnene-3-one-17α:20:21-triol instead of from the described starting compound, there is obtained the stereoisomeric aldehyde $\Delta^4$-17-formyl-androstene-3-one-17αol of the formula

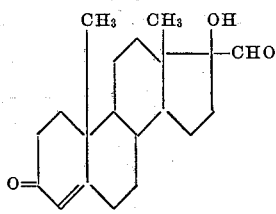

which melts at 133–135° C. when recrystallized from little ether.

Both described aldehydes strongly reduce ammoniacal silver salt solution and yield a strong red coloring when heated with 1:4-dioxynaphthalene, glacial acetic acid and concentrated hydrochloric acid.

*Example 3*

3.5 parts of $\Delta^5$-pregnene-3:17β:20:21-tetrol of the formula

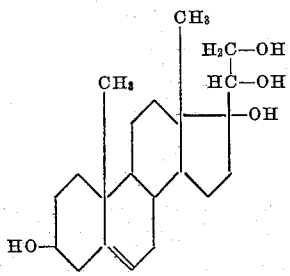

(obtained by allyl rearrangement of $\Delta^5$-17-vinyl-androstene-3:17-diol-3-acetate, action of osmium tetroxide and splitting the osmium ester by means of sodium sulfite) are dissolved in 400 parts of hot dioxane, the solution is cooled and mixed with 1.9 parts of periodic acid in 150 parts of water. The mixture is allowed to stand at room temperature until all the periodic acid is consumed which is the case after 1 hour at the latest. 20 parts of n-sodium bicarbonate solution are then added and the main quantity of the solvent is evaporated in a vacuum at 30° C. bath temperature. The residue is mixed with much water, extracted with chloroform, the chloroform solution is washed, dried and evaporated. The $\Delta^5$-17-formyl-androstene-3:17β-diol melting at 212–216° C. of the formula

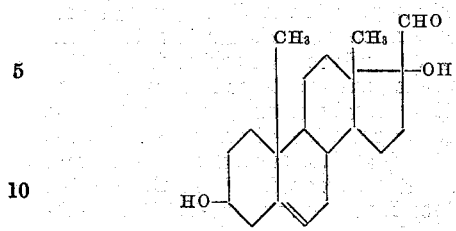

is then obtained by recrystallizing from a mixture of acetone and ether.

The two 17-formyl-androstane-3:17-diols may be obtained in analogous manner from the two ring-saturated allo-pregnane-3:17:20:21-tetrols, obtainable themselves according to the same method like the unsaturated tetrol. The 17α-form crystallizes from little ether in needles which after transformation of the crystals at 178° C. melt finally at 194–198° C. The 17β-form melts at 150–153° C. after recrystallization from ether. The two stereoisomers have conventionally the following formulas

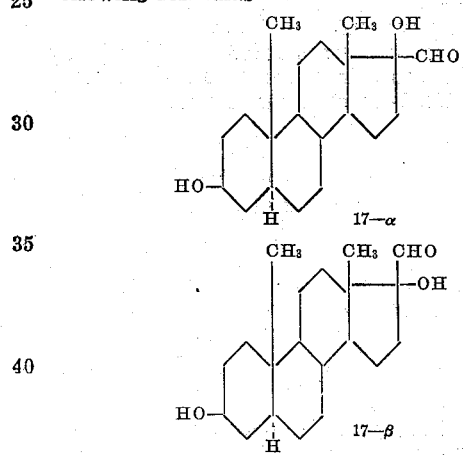

All the aldehydes described yield a strongly positive reaction with 1:4-dioxynaphthalene and with alkaline silver-diammine solution.

*Example 4*

As starting compound there is used 20-methyl-allopregnane-3:17β:20:21-tetrol of the formula

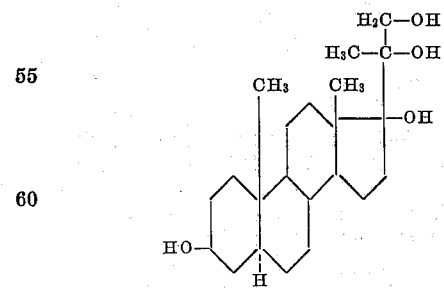

This compound may be obtained for example from $\Delta^5$-21-acetoxy-pregnene-3-ole-20-one by reaction with methylmagnesium halide, acetylation with acetanhydride in pyridine, hydrogenation in presence of a platinum catalyst, elimination of water by means of phosphorous hydroxychloride in pyridine and hydroxylation with osmium tetroxide in ethereal solution. 1.2 parts of this starting material are dissolved in 360 parts of freshly distilled methanol. To this solution there is added a solution of 0.7 part of sodium periodate in 400 parts of water to which had been added 0.4 part of concentrated sulfuric acid. The whole is allowed to stand at room temperature until the periodic acid is completely consumed, the sulfuric acid in excess is neutralized with sodium carbonate solution and the reaction mixture is concentrated until the methanol is nearly entirely removed. The residue is shaken out with ether, the ether solution is washed with sodium carbonate solution and water, dried and evaporated. From the residue there is obtained the allo-pregnane-3:17β-diol-20-one of the formula

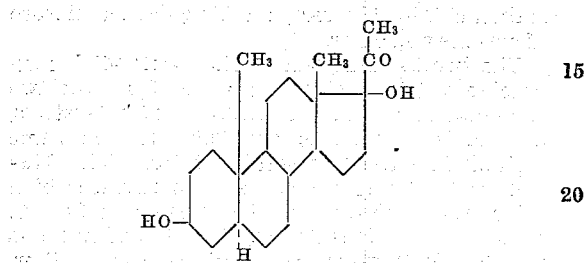

which, when recrystallized from absolute alcohol, melts at 264–266° C. and is characterized by an acetate of melting point 191–192° C.

Instead of from the saturated tetrol one may also start for example from Δ⁵-20-methyl-pregnene-3:17β:20:21-tetrol of the formula

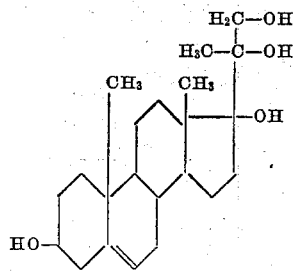

which is obtainable like the saturated compound, but omitting the catalytic hydrogenation. There is then obtained in quite analogous manner the Δ⁵-pregnene-3:17β:diol-20-one of the formula

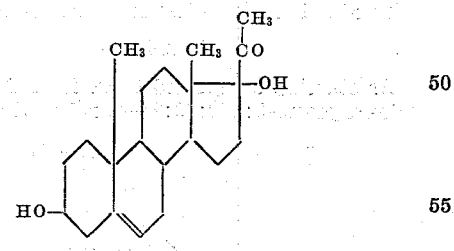

crystallizing in needles from a mixture of alcohol and benzene, which after transformation between 263 and 283° C. melt at about 290° C. with decomposition. Its mono-acetate melts at 233° C. The dioxy compound can be converted into the 17-β-hydroxy-progesterone, for example by subsequent dehydrogenation. The latter compound is also obtained directly by glycol cleavage of the Δ⁴ - 20 - methyl - pregnene - 3-one-17β:20:21-triol which is itself obtainable from a desoxycorticosterone-diacylate, for example analogously to the corresponding 3-hydroxy compound.

The corresponding higher homologues from the series of the pregnane-17-ol-20-ones are obtained when starting from compounds which are substituted in 20-position by other hydrocarbon radicals, for example by ethyl, propyl, phenyl or benzyl, instead of from 20-methyl derivatives.

*Example 5*

3.8 parts of Δ⁵-20-methyl-21-hydroxymethyl-pregnene-3:20:21-triol of the formula:

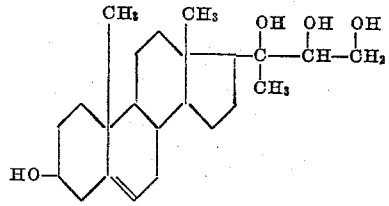

(obtained by attachment of acetylene-sodium to pregnene-olone-acetate, partial reduction of the triple bond to the double bond by means of palladium-calcium carbonate catalyst and hydroxylation of the double bond in the side chain with osmium tetroxide) are shaken with 1000 parts of benzene and 4.4 parts of lead tetraacetate at 40° C. in an atmosphere of nitrogen until an oxidizing agent can no longer be detected with starch iodide paper. A strong formaldehyde odor is noticeable. The finely dispersed lead diacetate is suction-filtered, the filtrate is washed with benzene and evaporated. By recrystallization from ether the residue produces the Δ⁵-20-methyl-pregnene-3:20-diol-21-al of the formula:

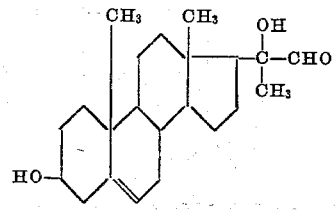

The same product can also be obtained when using as oxidizing agent for example lead tetrapropionate, lead tetrabenzoate and the like. It yields a strong red coloring when heated with 1:4-dioxynaphthalene in glacial acetic acid and concentrated hydrochloric acid, further it reduces alkaline silver diammine solution very strongly.

*Example 6*

1.8 parts of d-mannite of the formula

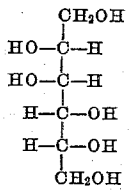

are dissolved in 80 parts of water and this solution is mixed at 0° C. with a solution of 1.9 parts of periodic acid in 20 parts of water. After standing for several hours the whole is extensively neutralized with freshly precipitated barium carbonate, mixed with baryta water until the reaction on phenol-phthalein is just alkaline, and the excess is immediately removed with carbonic acid. The mixture is filtered, the filtrate is evaporated in a vacuum and the remaining syrup is ground with methanol. After renewed filtration and strong concentration in a vacuum a small quantity of unchanged mannite is crystallized. It is suction-filtered, the filtrate is evaporated to dryness, taken up in very little methanol and mixed with absolute alcohol until no further precipitation occurs. The solution is filtered, and the filtrate is evaporated, the residue being a syrup which strongly reduces Fehling's solution.

Crystallization occurs after inoculation with d-arabinose of the formula:

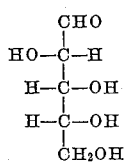

The product can also be detected by reacting the syrupy residue with the alkaline solution of 110 per cent. of its weight of asymmetrical diphenyl-hydrazine by boiling for ¼ hour.

The 1-arabomethylose is obtained in analogous manner as a reducing colorless syrup when starting from methyl-pentit-1-rhamnit. It can be identified by formation of a phenyl-osazone of melting point 174° C. or of an ethyl-mercaptan of melting point 108° C.

The new process may be used quite generally for the production of aldoses starting from a polyhydric alcohol containing at least three neighboured carbinol groups, at least one of them being a primary one.

What I claim is:

1. Process for the manufacture of α-hydroxy-carbonyl compounds of the saturated and unsaturated cyclopentanopolyhydrophenanthrene series comprising dissolving in a solvent a compound of the said series having free hydroxyl groups on at least three vicinal carbon atoms in the 17, 20, 21 and 22 positions, at least one of which is a primary hydroxyl group, combining it with a solution containing an approximate equimolecular amount of an oxidizing agent selected from the group consisting of periodic acid and lead tetraacylates causing to split off the primary carbinol group, and arresting the reaction after the oxidizing agent has been substantially all consumed.

2. Process for the manufacture of α-hydroxy-carbonyl compounds of the saturated and unsaturated cyclopentanopolyhydrophenanthrene series, comprising dissolving in a solvent a compound of the said series containing at least three vicinal carbon atoms which are each substituted by a free hydroxyl group, at least one of them being a primary hydroxyl group, combining it with a solution containing an approximate equimolecular amount of an oxidizing agent selected from the group consisting of periodic acid and lead tetraacylates causing to split off the primary carbinol group, and arresting the reaction after the oxidizing agent has been substantially all consumed.

3. Process for the manufacture of saturated and unsaturated 17-oxy-pregnan-20-ones, which comprises treating a member of the group consisting of a saturated and an unsaturated 20-methyl-pregnan-17:20:21-triol with the approximate equimolecular amount of an oxidizing agent causing to split off the primary carbinol group in 21-position.

4. Process for the manufacture of saturated and unsaturated 17-oxy-pregnan-20-ones, which comprises treating a member of the group consisting of a saturated and an unsaturated 20-methyl-pregnan-17:20:21-triol with the approximate equimolecular amount of periodic acid causing to split off the primary carbinol group in 21-position.

5. Process for the manufacture of saturated and unsaturated 17-formyl-androstan-17-ols, which comprises treating a member of the group consisting of a saturated and an unsaturated pregnan-17:20:21-triol with the approximate equimolecular amount of an oxidizing agent causing to split off the primary carbinol group in 21-position.

6. Process for the manufacture of saturated and unsaturated 17-formyl-androstan-17-ols, which comprises treating a member of the group consisting of a saturated and an unsaturated pregnan-17:20:21-triol with the approximate equimolecular amount of periodic acid causing to split off the primary carbinol group in 21-position.

TADEUS REICHSTEIN.